United States Patent [19]

Brockmeyer et al.

[11] Patent Number: 5,300,162
[45] Date of Patent: Apr. 5, 1994

[54] PROCESS FOR THE PRODUCTION OF AN OPTICAL COUPLER FOR POLYMERIC OPTICAL FIBERS

[75] Inventors: Andreas Brockmeyer, Liederbach; Hans Vowinkel, Flörsheim; Werner Groh, Lich; Thomas Stehlin, Hofheim am Taunus; Jürgen Theis, Oberursel, all of Fed. Rep. of Germany

[73] Assignee: Hoechst Aktiengesellschaft, Frankfurt am Main, Fed. Rep. of Germany

[21] Appl. No.: 799,372

[22] Filed: Nov. 27, 1991

[30] Foreign Application Priority Data

Nov. 29, 1990 [DE] Fed. Rep. of Germany ....... 4038018

[51] Int. Cl.$^5$ ...................... B65H 69/02; B32B 31/16
[52] U.S. Cl. .................................. 156/73.2; 156/73.1; 156/158; 156/304.3; 156/304.6; 156/379.9; 264/23
[58] Field of Search ....................... 156/73.1, 73.2, 157, 156/158, 159, 304.1, 304.3, 304.2, 304.6, 309.9, 322, 379.9; 264/23

[56] References Cited

U.S. PATENT DOCUMENTS

| | | | |
|---|---|---|---|
| 4,043,854 | 8/1977 | Le Noane et al. | 156/158 |
| 4,172,746 | 10/1979 | Le Noane et al. | 156/91 |
| 4,176,909 | 12/1979 | Prunier | 350/96.20 |
| 4,212,512 | 7/1980 | Hodge | 385/46 |
| 4,220,619 | 9/1980 | Kersten | 264/230 |
| 4,288,143 | 9/1981 | Di Vita | 156/158 X |
| 4,360,248 | 11/1982 | Bickel et al. | 350/96.16 |
| 4,514,242 | 4/1985 | MacLaughlin et al. | 156/73.5 |
| 4,919,851 | 4/1990 | Coutandin et al. | 264/1.5 |

FOREIGN PATENT DOCUMENTS

0439125A1 7/1991 European Pat. Off. .
WO89/02608 3/1989 PCT Int'l Appl. .
WO90/11540 10/1990 PCT Int'l Appl. .

OTHER PUBLICATIONS

Patent Abstracts of Japan, Publication No. JP56, Jan. 27, 1981, Toshiba Corp., "Manufacture of Optical Waveguide".

Primary Examiner—David A. Simmons
Assistant Examiner—J. Sells
Attorney, Agent, or Firm—Curtis, Morris & Safford

[57] ABSTRACT

In a process for the production of an optical coupler for polymeric optical fibers using ultrasound welding, the fibers are warmed, before the welding, to a temperature of from 50° to 250° C. for from 0.2 to 3 hours. The polymeric optical fibers are introduced into a plastic tube which melts with the fibers during the welding operation to form a unit. In another embodiment, a connector bar which has the same refractive index as the core material of the polymeric optical fibers can be inserted into the plastic tube, the polymeric optical fibers are brought into contact with the connector, and the plastic tube, the connector bar and the fibers are welded to one another under the action of ultrasound.

9 Claims, 3 Drawing Sheets

PROCESS FOR THE PRODUCTION OF AN OPTICAL COUPLER FOR POLYMERIC OPTICAL FIBERS

In passive optical fiber networks, couplers serve as optical components for apportioning the light signals from incoming optical fibers to outgoing optical fibers. Such couplers comprise a transparent body which is connected to optical fibers on the light inlet side and on the light outlet side. In addition to couplers formed by bonding or melting transparent moldings together with optical fibers, couplers are also known in whose production optical fiber bundles are twisted and stretched at the twist point (cf. Agarwal, Fiber Integr. Optics 6 (1), 27–53, 1987).

The production of assembled couplers of this type is complex and expensive; furthermore, the transmission attenuation of such known couplers is difficult to reproduce, so the output varies by more than 2 dB between the various output fibers.

Couplers in which fiber bundles comprising polymeric optical fibers are melted by means of a shrinkable sleeve (DE-A-37 37 930) or optical fibers which are attached to the end face of a cylindrical mixing zone (R. D. Codd, SAE/IEEE, International Congress of Transportation Electronics, 1984) are likewise known.

A further process for the production of optical couplers is described in DE-A-40 13 307, which was not published before the date of filing of this application. Here, the optical fibers are bundled using a plastic tube, and this tube is enveloped by a shrinkable plastic sleeve in a subsequent step. At elevated temperature, the fibers melt with the plastic tube as a consequence of the pressure and the heating action of the shrinkable sleeve. In this case, the heating is effected by means of electrical resistance heating, the welding times being on average 0.5 to 1 hour.

The essential disadvantage of the known production processes is the complex and time-consuming series of process steps, as a result of which only relatively expensive unit-by-unit production is possible.

The object was to find a process which allows mechanically stable couplers to be produced simply and inexpensively and in a relatively short time. It should be possible to carry out such a process with monitoring, so that it is possible to produce couplers having low output attenuation and little variation between the outputs of the output fibers.

The present invention achieves this object. It relates to a process for the production of a coupler from polymeric optical fibers in which the fibers are welded to one another over the length of the mixing zone.

For the process according to the invention, from two to $10^5$, preferably from 2 to 1000, polymeric optical fibers are ordered in the same direction, if desired twisted with one another and bundled. The fibers are warmed to a temperature of from 50° to 250° C. for a period of from 0.2 to 3 hours and then welded to one another with the aid of ultrasound. The ultrasound method is not a nondestructive welding method. Welding without prior warming of the plastic parts to be welded would result in the destruction thereof, in particular in the case of hard, brittle materials. Only after prior warming to a defined temperature at which the fiber material still experiences no change enables nondestructive melting of the optical fibers to one another.

DETAILED DESCRIPTION OF THE PREFERRED EMBODIMENTS

Figure 1:
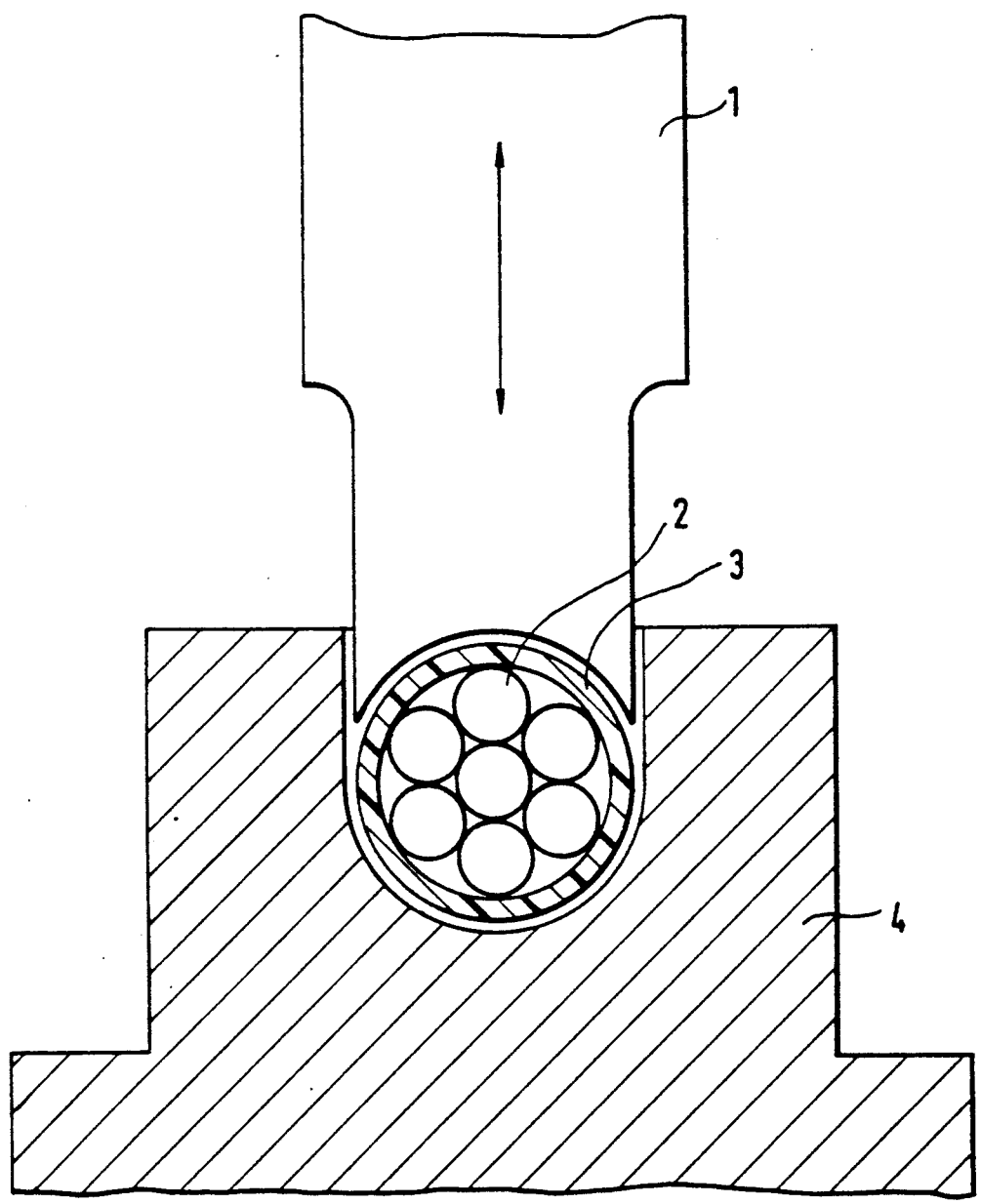
FIG. 1 shows one embodiment for welding optical fibers together.

In the process according to the invention, the polymeric optical fibers are kept at a temperature of from 50° to 250° C., preferably at from 130° to 150° C., for from 0.2 to 3 hours, preferably for from 5 to 30 minutes, and subsequently welded to one another in an ultrasound welding unit at a frequency in the range from 10 to 60 kHz, preferably at from 20 to 40 kHz. The pressure used in the unit is, in the process according to the invention, in the range from 1 to 10 bar, preferably in the range from 2 to 4 bar. The welding times are from 0.1 to 3 seconds, preferably from 0.1 to 1.5 seconds. The hold times are in the range from 0.1 to 10 seconds, preferably from 0.1 to 5 seconds. The hold time is in this case taken to mean the time after welding in which the sonotrode (1) still surrounds the fibers which lie in, respectively on, the sonotrode operating area (4), under pressure. The hold times correspond at least to the welding times, but are preferably selected to be somewhat longer than the latter. Since the fiber material is warmed under pressure and additional friction forces occur due to the action of ultrasound (interface friction, internal friction of the macromolecules), the stresses which occur can still be compensated in this way.

The vibration amplitudes of the sonotrodes (1) in the process according to the invention are in a range from 10 to 65 μm, preferably from 20 to 50 μm, and are generally material-specific.

The duration of the prewarming time depends on the temperature. In the case of relatively short prewarming times, elevated temperatures are preferably used. The temperatures used in each case are furthermore dependent on the fiber materials and are chosen to be lower in the case of relatively sensitive materials, which could experience decomposition or destruction in the upper temperature range, than in the case of more robust materials.

In a preferred case, the fibers are dried, before prewarming, for from 5 to 30 hours in vacuo at temperatures in the range from 40° to 100° C. The principal purpose of this predrying is to remove any residual monomer still present and any traces of moisture, which can accumulate in the fibers, in particular in the case of relatively long storage periods, and thus to prevent any bubble formation which may occur. In the case of freshly spun fibers, this predrying can be omitted.

By acoustically irradiating the joint zone on both sides, it is possible to further shorten the welding times, which results in very homogeneous weldings.

In the process according to the invention, the fibers to be welded can comprise, in the region to be welded, either core and cladding material or only core material. If the optical cladding has already been removed, it is expedient, after the welding process, to surround the mixing zone again with optical cladding. One possibility is to pull a shrinkable sleeve over this region. In order to adopt the function of optical cladding, this sleeve must have a lower refractive index than the fibers.

A shrinkable sleeve which is suitable for the process according to the invention comprises, for example, a polyolefin, polyvinyl chloride, polyvinylidene chloride, polytetrafluoroethylene, polychloroprene, vinylidene fluoride-hexafluoropropylene copolymer, silicone rubber, polyester, fluorinated ethylene-propylene copolymer or a polyfluoroalkoxy copolymer.

In another preferred embodiment, a coating, preferably having a lower refractive index than the core material and thus likewise being suitable as optical cladding for the mixing zone, can subsequently be applied to the mixing zone for protection thereof.

In a further embodiment, the polymeric optical fibers (2) can be surrounded over the length of the mixing zone with a plastic tube (3) (FIG. 1), over which a shrinkable sleeve may, if desired, be pushed after the welding process. The plastic tube (3) has the task of melting with the fibers during the welding process, surrounding the fibers uniformly and filling any cavities which may occur between the fibers, which makes it possible to further reduce the attenuation of couplers produced in this way. In this way, it is possible to achieve a very good match of the fiber bundle over the entire area to the mixing zone. Surface losses do not occur.

The tube gives the mixing zone high mechanical stability and furthermore protects the latter against climatic effects.

It is appropriate to select the material of the plastic tube so that its refractive index is, for the abovementioned reasons, below that of the core material of the fibers, so that it additionally takes on the function of the optical cladding. Suitable materials for plastic tubes (3) of this type are all highly transparent polymers whose refractive index is lower than the refractive index of the fiber core, for example polymethyl methacrylate (PMMA), polycarbonate (PC), poly-4-methylpentene or fluorine-containing polymers.

Figure 2:
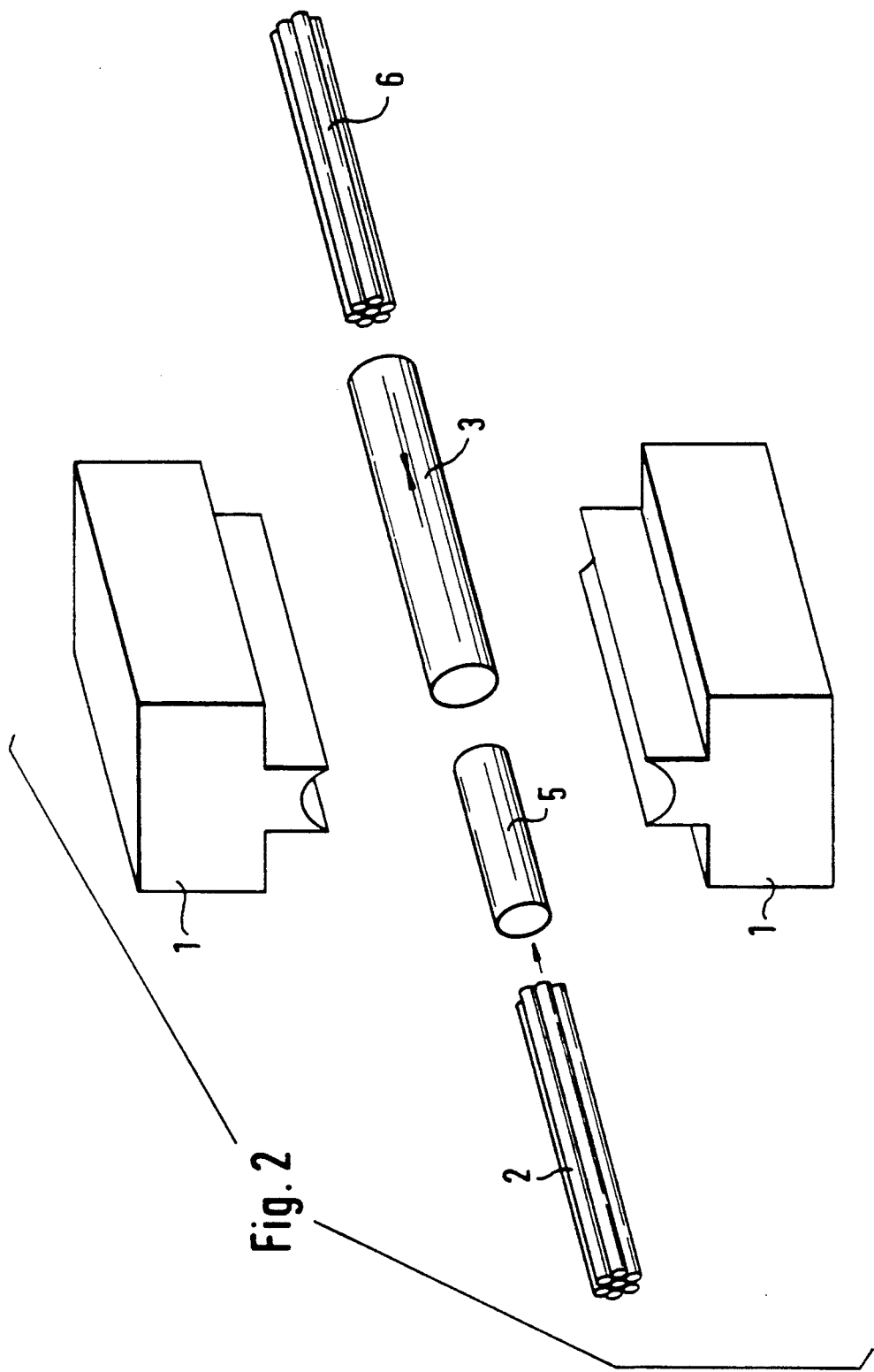
FIGS. 2–3 show the steps of an alternative embodiment for welding optical fibers together.
Figure 3:
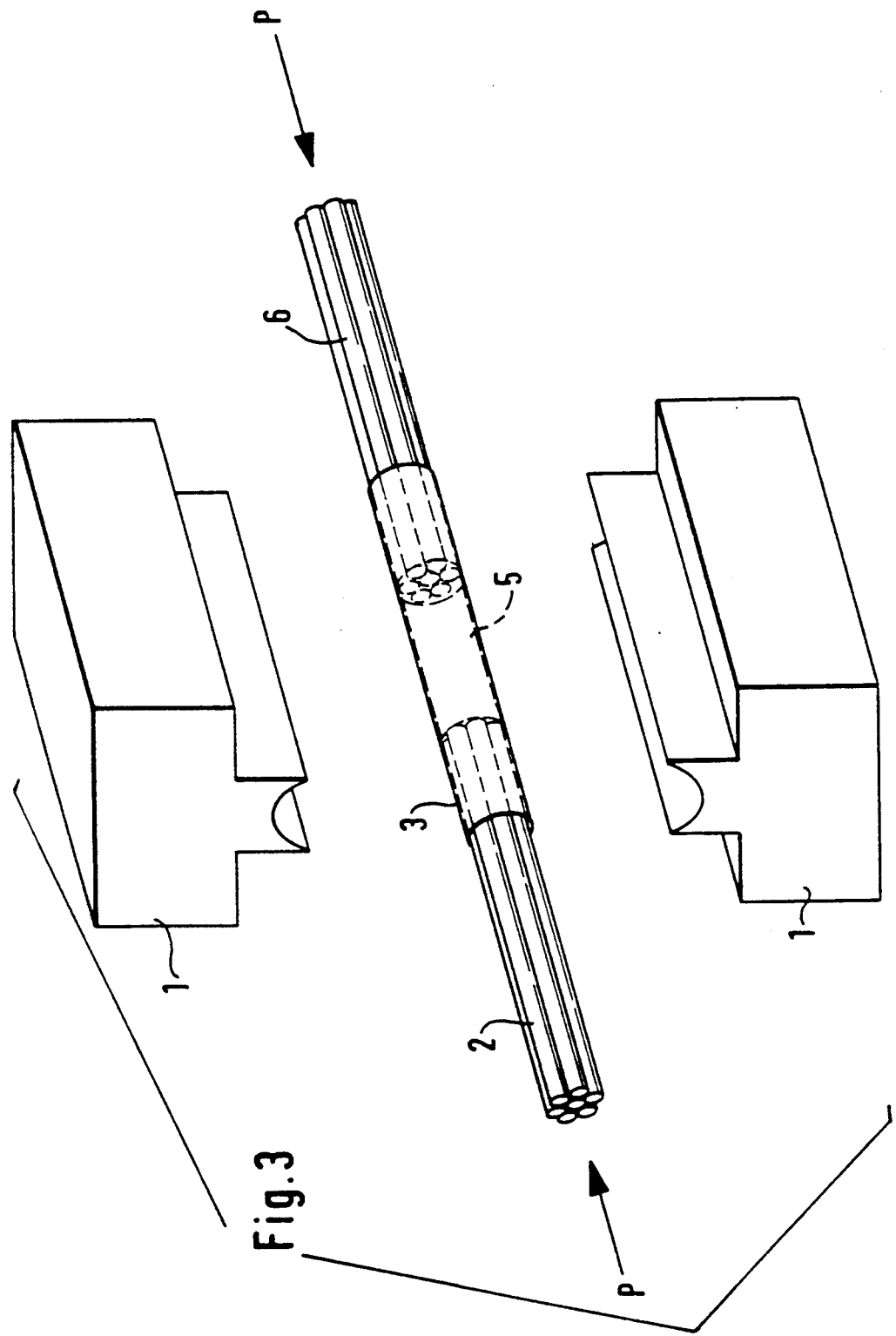

In a further embodiment, it is possible to weld from 2 to $10^5$ fibers (6) directly to a so-called mixing connector or connector bar (5) (ultrasound weld pressing, FIGS. 2 and 3). The mixing connector here comprises a material which has the same refractive index as the core material of the fibers, and preferably comprises the same material. Examples of frequently used core materials are polymethyl methacrylate and polycarbonate.

To produce a coupler of this type, the mixing connector (5) is inserted into a plastic tube (3) and centered in the middle of the tube. The fibers (6) to be welded to the mixing connector are bundled and likewise inserted into the tube and positioned against the connector. The action of ultrasound and pressure causes the fibers to melt with the mixing zone. This process offers the advantage that the fibers need not be freed from the cladding material before the welding process, and that no plug-in connections, which make a considerable contribution toward increasing the attenuation values, need be used in a coupler of this type.

The ultrasound welding process according to the invention is suitable for all polymeric optical fibers with and without optical cladding. The optical fibers preferably used for couplers for the transmission of optical data signals are those without optical cladding at the connection point, and those preferred for fiber bundles for illumination purposes are those with cladding.

The ultrasound welding technique makes it possible to use very short welding times, which, under optimum experimental conditions, can be reduced to well below one second. The process according to the invention makes it possible to produce, in a simple, inexpensive and time-saving manner, couplers having a mixing zone with a very homogeneous structure.

EXAMPLE 1

The optical cladding of seven plastic optical fibers made of polycarbonate and having a length of 0.4 m and a diameter of 1 mm each was removed in a 3 cm zone using petroleum ether. A PMMA tube ($n_k = 1.49$) was subsequently pushed over this zone. The refractive index of the fibers was $n_k = 1.58$. The PMMA tube had an internal diameter of 3 mm, a wall thickness of 1 mm and a length of 3 cm.

The seven fibers were welded homogeneously to the PMMA tube in a commercially available ultrasound welding unit, known in polymer and ceramics processing, through exposure to ultrasound at a frequency of 20 kHz.

By warming the joint parts (optical fiber bundle/PMMA tube) to a temperature from 130° to 150° C., it was possible to weld these parts to one another in a nondestructive manner. In order to avoid bubble formation, the fibers used were dried, before warming, at 80° C. for 24 hours in vacuo.

The ultrasound welding unit had a generator output of 2 kW. The sonotrode vibration amplitude (peak-peak) was in the range from 30 to 50 μm. The unit pressure was from 2 to 4 bar.

The welding time was 0.3 second, at a hold time of 3 seconds.

Equally good results were also achieved at higher ultrasound frequencies (from 30 to 40 kHz) using pre-warmed joint parts. In order to achieve good welding over the mixing zone, a PMMA tube, into which the fibers are subsequently inserted, was placed in the sonotrode operating area (4). FIG. 1 illustrates this tool arrangement.

The 7×7 star coupler produced in the transmission mixer had an excess loss of 2.4 dB, with the output varying between random output fibers by a maximum of 1.6 dB.

EXAMPLE 2

In order to avoid the insulation process (as in Example 1), the arrangement to be welded was modified somewhat. Firstly, seven polycarbonate fibers (diameter 1 mm) in each case were bundled by means of a shrinkable sleeve in such a manner that 1 cm of fibers was not covered by the shrinkable sleeve on one side and 8 cm of fibers were not covered on the opposite side of the shrinkable sleeve. The shrinkable sleeve had a length of 40 mm.

A polycarbonate connector bar (diameter 2.9 mm, length 30 mm) whose ends were polished was then pushed into a PMMA tube (internal diameter 3 mm, wall thickness 1 mm) having a length of 50 mm. A fiber bundle comprising 7 individual fibers in each case was then inserted into each end of the tube so that the polycarbonate bar was centered. This arrangement was likewise welded by means of ultrasound analogously to Example 1.

The action of pressure and ultrasound caused good melting between the fiber bundle and the connector bar. A good match over the whole area was furthermore produced between the mixing zone and the fiber bundle.

The insertion attenuation, averaged over all inlet and outlet channels, was 11.5 dB, giving an excess loss of about 3.1 dB. The difference between the outlet fibers was 2 dB.

We claim:

1. A process for the production of an optical coupler for polymeric optical fibers by arranging and bundling fibers in the same direction and connecting them, which comprises warming only the core material of the fibers over the region to be welded to a temperature of from 50° to 250° C. for a period of from 0.2 to 3 hours and subsequently welding the fibers with the aid of ultrasound.

2. A process for the production of an optical coupler for polymeric optical fibers, which comprises inserting a connector bar which is formed of a material which has the same refractive index as the core material of the fibers into a plastic tube and centering the connector in the middle thereof, inserting from 2 to $10^5$ polymeric optical fibers into the tube and bringing them into contact with the connector, heating only the core material of the fibers over the region to be welded to a temperature of from 50° to 250° C. for a period of from 0.2 to 3 hours and subsequently welding the plastic tube, the connector bar and the fiber bundle to one another under the action of ultrasound.

3. The process as claimed in claim 1, wherein a plastic tube which melts with the fibers during the welding operation to form a unit surrounds the fibers.

4. The process as claimed in claim 3, wherein the plastic tube has a lower refractive index than the core material of the polymeric optical fibers.

5. The process as claimed in claim 3, wherein the plastic tube comprises a polymethyl methacrylate, a polycarbonate, a poly-4-methylpentene or a fluorinated polymer.

6. The process as claimed in claim 3, wherein the plastic tube is enveloped with a shrinkable sleeve after the welding process.

7. The process as claimed in claim 1, wherein the welding process is carried out at a pressure in the range from 1 to 10 bar, preferably in the range from 2 to 4 bar.

8. The process as claimed in claim 1, wherein the fibers are welded at a frequency in the range from 10 to 60 kHz, preferably in the range from 20 to 40 kHz.

9. The process as claimed in claim 1, wherein the welding time is in the range from 0.1 to 3 seconds, preferably in the range from 0.1 to 1.5 seconds, and the hold time is in the range from 0.1 to 10 seconds, preferably in the range from 0.1 to 5 seconds.

* * * * *